United States Patent
Pochner

(10) Patent No.: US 12,434,594 B2
(45) Date of Patent: Oct. 7, 2025

(54) ENERGY MANAGEMENT DEVICE AND METHOD FOR PROVIDING AN ESTIMATED ENERGY VALUE FOR AN ENERGY STORE

(71) Applicant: PSA AUTOMOBILES SA, Poissy (FR)

(72) Inventor: Klaus Pochner, Rüsselsheim am Main (DE)

(73) Assignee: PSA AUTOMOBILES SA, Poissy (FR)

( * ) Notice: Subject to any disclaimer, the term of this patent is extended or adjusted under 35 U.S.C. 154(b) by 49 days.

(21) Appl. No.: 18/554,154

(22) PCT Filed: Feb. 23, 2022

(86) PCT No.: PCT/EP2022/054479
§ 371 (c)(1),
(2) Date: Oct. 31, 2023

(87) PCT Pub. No.: WO2022/218594
PCT Pub. Date: Oct. 20, 2022

(65) Prior Publication Data
US 2024/0198849 A1 Jun. 20, 2024

(30) Foreign Application Priority Data
Apr. 13, 2021 (DE) ..................... 10 2021 203 610.4

(51) Int. Cl.
*G01R 31/367* (2019.01)
*B60L 58/10* (2019.01)
*G01R 31/387* (2019.01)

(52) U.S. Cl.
CPC ............ *B60L 58/10* (2019.02); *G01R 31/387* (2019.01); *B60L 2260/52* (2013.01)

(58) Field of Classification Search
CPC ..................................................... B60L 58/10
See application file for complete search history.

(56) References Cited

U.S. PATENT DOCUMENTS 8,405,355 B2 * 3/2013 Minarcin ........... G01R 31/3835
320/132
11,150,305 B2 * 10/2021 Jokar .................... G01R 31/392
(Continued)

FOREIGN PATENT DOCUMENTS

DE 10 2013 002243 A1 8/2014
DE 10 2015 118976 A1 5/2016
(Continued)

OTHER PUBLICATIONS

International Search Report for PCT/EP2022/054479 mailed May 27, 2022.
Written Opinion for for PCT/EP2022/054479 mailed May 27, 2022.

*Primary Examiner* — Rexford N Barnie
*Assistant Examiner* — Esayas G Yeshaw
(74) *Attorney, Agent, or Firm* — Sandberg Phoenix & von Gontard P.C.

(57) ABSTRACT

The invention relates to an energy management device (100) for an energy store (106), comprising an energy store (106), an energy storage management apparatus (103) and an energy estimation apparatus (104), wherein the energy storage management apparatus (103) is designed to detect and provide a plurality of energy storage parameters present in the energy store (106), wherein the energy estimation apparatus (104) is designed to receive the plurality of energy storage parameters and to provide an estimated energy value from the plurality of energy storage parameters, characterised in that the energy estimation apparatus (104) selects substantially only electric current parameters from the provided plurality of energy storage parameters and wherein an electric current parameter is a parameter which has an influence on the electric current flow into and/or out of the energy store (106).

7 Claims, 3 Drawing Sheets

(56) References Cited

U.S. PATENT DOCUMENTS

| | | | | |
|---|---|---|---|---|
| 2012/0074960 A1* | 3/2012 | Minarcin | ................ | B60L 58/12 |
| | | | | 324/658 |
| 2013/0257323 A1* | 10/2013 | Diamond | .................. | B60L 3/12 |
| | | | | 320/118 |
| 2020/0231060 A1* | 7/2020 | Matsuyama | ............ | B60L 53/62 |
| 2021/0063491 A1* | 3/2021 | Jokar | .................... | G01R 31/382 |
| 2021/0190876 A1* | 6/2021 | Takechi | ............. | G01R 31/3842 |

FOREIGN PATENT DOCUMENTS

| | | |
|---|---|---|
| DE | 10 2018 116826 A1 | 1/2019 |
| GB | 2505663 A | 3/2014 |
| GB | 2515582 A | 12/2014 |
| WO | 2013026070 A2 | 2/2013 |

\* cited by examiner

ENERGY MANAGEMENT DEVICE AND METHOD FOR PROVIDING AN ESTIMATED ENERGY VALUE FOR AN ENERGY STORE

CROSS-REFERENCE TO RELATED APPLICATIONS

The present application is the US National Stage under 35 USC § 371 of International Application No. PCT/EP2022/054479, filed Feb. 23, 2022, which claims the priority of German application 10 2021 203 610.4 filed on Apr. 13, 2021, the content (text, drawings and claims) of both said applications being incorporated by reference herein.

BACKGROUND

The described methods and devices relate to the technical field of transport systems. In particular, they relate to an energy management device, a method for providing an estimated energy value for an energy storage device, and a transport means.

More recent electrical energy storage techniques and further developed drive technologies are associated with reduced manufacturing costs for the development of new transport and transportation means, such as hoverboards, and also ensure that more and more conventional transport means are being electrified, such as scooters or bicycles.

In addition, electrical energy storage devices, especially because of their better environmental compatibility, are increasingly being installed in transport means such as cars or trucks, which are offered on the market, for example, as all-electric vehicles (electric vehicles, EV's) or battery-operated electric vehicles (BEV's), as hybrid electric vehicles (HEV's) or as plug-in hybrid electric vehicles (PHEV's).

However, a great uncertainty exists for a user of electrically-operated transport means, since the state of charge of the energy storage device and thus a range and/or usage time can be predicted only with difficulty.

While light vehicles such as E-bicycles or E-scooters can usually continue to be used or transported to a charging station for the energy storage device in the event of a spent energy reserve, an empty energy storage device represents a big problem in a car or truck. If it were to break down, a heavy vehicle of this kind can usually only be transported with a high cost outlay to a charging station.

Therefore, display apparatuses have been developed which can display to a user of the transport means at least the state of charge of the energy storage device and optionally an estimated range derived therefrom.

The publication DE 10 2013 002 243 A1 relates to a technique for outputting a range indication for a vehicle. One aspect for this method comprises determining a drive energy supply of the vehicle and calculating a range of the vehicle on the basis of the drive energy supply; retrieving transport network information, wherein the transport network information comprises information regarding the representation of a transport network; displaying the transport network based upon the retrieved transport network information and a range identifier lying around a starting point within the displayed transport network and indicating the range of the vehicle; determining a destination; calculating one or more routes between the starting point and the destination on the basis of the transport network information; determining a remaining distance for the one or more routes, wherein the remaining distance is from the starting point to an end point which lies on the respective route and at which the drive energy reserve will be depleted, and wherein the end point is determined on the basis of the transport network information; and outputting an indication when at least one end point located on one of the routes has been determined.

The document WO 2013/026070 A2 describes a battery management unit (BMU) which is coupled to a battery pack of any vehicle (xEV) which draws at least a portion of its driving force from an electrical energy source, wherein the BMU is configured to determine a remaining energy value for the battery pack at least partially on the basis of a minimum cell temperature and a minimum cell state-of-charge percentage (SOC %), which is determined by the BMU for the battery pack.

The document DE 10 2015 118 976 A1 relates to a method for estimating the range per full charge (RPC) for a vehicle. The method includes a controller, which, in response to detecting a predefined condition influencing the vehicle power consumption, can output, by a controller to an interface, an RPC and identifier indicating an extent at which the predefined condition affects the RPC. An electrically-operated vehicle is also provided which contains one or more vehicle components, a traction battery for supplying energy to the vehicle components, one or more sensors, and a controller. The one or more sensors monitor the vehicle components, the traction battery, and pre-selected ambient conditions. The controller is configured to generate, in response to an input from the sensors, an output for an interface that includes an RPC and identifier indicating an extent of the influence of each of the ambient conditions and of the operation of the components and the battery on the RPC.

The document DE 10 2018 116 826 A1 describes a vehicle which includes a set of drive wheels and also an energy source with available energy, a torque-generating device which is driven by the energy source in order to provide a drive torque, a transmission configured to receive the drive torque and provide an output torque to the set of drive wheels, and a controller. The controller predicts, as part of a programmed method, the consumption of the available energy along a predetermined route using onboard data, offboard data, and a first logic block, and also corrects the predicted energy consumption using the onboard data, offboard data, and an error correction loop between a second logic block and the first logic block. The controller also executes a control measure with respect to the vehicle using the corrected energy consumption, including changing a logic state of the vehicle.

SUMMARY

The object is to provide efficient energy management for an energy storage device.

The described methods and devices result from the features of the independent claims. Advantageous developments and embodiments are the subject matter of the dependent claims. Further features, possible applications, and advantages can be found in the following description, and in the explanation of exemplary embodiments, which are shown in the figures.

According to one aspect, an energy management device for an energy storage device is provided which has an energy storage device, an energy storage management apparatus, and an energy estimation apparatus. The energy storage management apparatus or the battery management system (BMS) is set up to detect and provide a plurality of energy storage parameters present in the energy storage device.

The energy estimation apparatus is set up to receive the plurality of energy storage parameters and to provide an estimated energy value from the plurality of energy storage parameters.

The object is achieved with the energy management device in that the energy estimation apparatus selects from the provided plurality of energy storage parameters substantially only electric current parameters, wherein an electric current parameter is a parameter which has an influence on the electric current flow into and/or out of the energy storage device.

The estimated energy value is a state of energy value (SoE) which allows a statement about the energy content of the energy storage device, the battery, and/or the accumulator.

A very precise statement about the charge and/or the state of charge value (SoC) of the energy storage device can be made via the electric current parameters.

The energy content of an energy storage device, and in particular of an accumulator and/or of a battery, is very difficult to measure directly. It is therefore often calculated by indirect variables which are linked by means of a formula. The electrical energy of a battery may be calculable substantially via the physical variables constituted by electric current I and voltage U.

In order to make a statement about the state of charge of the battery, electric current and voltage must thus be measured continuously. Substantially instantaneous measurement values may be used here. However, the voltage is a very inaccurate variable, which may dip under load, for example. For precise measurement, the load thus ought to be separated from the battery before the measurement.

However, the estimated energy value is interesting, since a range indication for a transport means, e.g., a motor vehicle or a truck, can be made if typical consumption values are indicated for the vehicle, these being specified, for example, in kWh/100 km. The predictions may be refined further still if the topology of the route and the consumption value associated with the respective topology can be taken into account—for example, whether the destination to be reached leads over a mountainous and/or level surface.

The electric current parameter is advantageously at least one energy storage parameter selected from the group of energy storage parameters consisting of an electric current balance value, an electrical resistance of the energy storage device, an instantaneous voltage at the energy storage device, an instantaneous electric current at the energy storage device, an energy storage device temperature, an age of the energy storage device, and an inter-cell voltage difference of individual cells of the energy storage device—in particular, when the energy storage device is designed as an energy storage device pack or energy storage device packet.

By means of the electric current balance value, the charge amount of a battery can be determined with high accuracy if some boundary conditions are observed. This is because charge per se may only disappear to a very small extent in the form of a leakage current. Particularly in the case of a short downtime of the transport means, a leakage current may be practically negligible. Therefore, with knowledge of the state of charge and of the supply and outflow of charge, it can be very precisely calculated what charge balance is present in the energy storage device.

Since charge can substantially only disappear in the form of an electric current, it may be advantageous to use electric current parameters for energy to determine the estimated energy value.

The electric current balance may be describable physically by the formation of the divergence of the electric current flow through a surface surrounding the energy storage device virtually, expressed by div ( ) and/or $\phi x$.

It may be possible to predict the range of an electrical vehicle operated with a battery, wherein the range is calculated, using an algorithm, from the available charge of the battery (state of energy, SoE) and the specific consumption in kWh/100 km.

By determining the charge and/or the electric current, it may be possible to correct the available energy of the battery taking into account a lower voltage of a discharged battery. When viewed from a voltage perspective, a falsification of the results could occur due to the load-induced voltage dip. The influence of the temperature on the resistance of the battery is also observed. In one example, historical consumption data may be combined with ambient conditions, such as external temperature and battery cooling, in order to calculate the battery temperature and its internal resistance.

By considering the electric current parameters, it may also be possible to use existing energy consumption models in order to supply an estimated energy value after these models have been transformed to electric current parameters and/or are expressed with electric current parameters.

According to another aspect, the energy management device has a range estimation apparatus (range estimator), wherein the range estimation apparatus is set up to convert the estimated energy value into an estimated range.

An estimated range may be determinable by means of an energy consumption model and/or an energy-range curve.

According to a further aspect, the range estimation apparatus uses an energy-range curve for converting the estimated energy value into the range, which energy-range curve is represented in electric current parameters.

By representing an energy-range curve and/or an energy model in electric current parameters, it may be usable for an electric current consideration of the range determination. The use of electric current values may substantially avoid inaccuracies due to load-induced voltage dips and the measurement errors caused thereby, which is why very precise range specifications are to be expected.

According to yet another aspect, the energy-range curve has a first and a second curve portion. The first curve portion is adapted here to the second curve portion such that the energy-range curve forms a continuous curve.

In other words, by means of this specification, an estimated value for the stored energy can be determined, e.g., in kWh, which is stable and converges towards a very exact estimated value which lies substantially in the just-before-empty or almost empty energy range of the energy storage device. The detailed consideration of the range before the energy from the energy storage device is substantially used up may therefore be useful, since this is the critical range which possibly decides whether a charging station can still be reached with the remaining energy amount. Breakdown of a transport means driven by the energy storage device could result if the reserve range is not shown with high accuracy.

Likewise, a prediction of consumption values that is as stable as possible may also contribute to a stable remaining range display. The prediction may be substantially independent of unstable events, such as a voltage dip under load.

Therefore, as soon as the second curve portion has been reached, a very precise range determination may be possible. Even if such an unstable event occurs, this may be compensated for and essentially not noticed at an output value. The lower voltage of a discharged battery may thus be taken into account. In particular, the load-based voltage dip may have only a slight influence on the electric current parameters.

In addition, a gradient of the curve may be kept constant in the second curve portion in order to enable the most continuous possible course of the remaining range. Changes in the position of the curve may be prevented by ensuring that the position of curve behaves continuously. Physical inadequacies, such as an increase in the energy without energy supply, may be taken into account and/or corrected. Such inadequacies may be due to difficult to predict voltage dips under load, and these may be corrected.

According to another aspect, a transition from the first curve portion to the second curve portion of the energy-range curve depends upon at least one transition criterion selected from the group of transition criteria consisting of an operating time, a state of charge of the energy storage device, a minimum distance from a destination, and a trigger event.

The electric current parameters may, at least in part, not be ready immediately after starting and only determined during the route traveled immediately after starting. A variable such as the state of charge can also be influenced by a preceding journey. Variables that can have an influence on a remaining range, such as a driver profile, may not be storable and therefore not available right at the beginning of a driving cycle. These must first be determined during the journey, and in particular when the driver changes.

It may also be useful if the accuracy of the supplied estimated energy value is extended to time ranges in which an accurate prediction is of great importance—for example, if the energy storage device is almost empty and/or has reached a third of its original charge.

It may also be possible to increase the accuracy and to use the energy management device by means of a trigger apparatus—for example, a switch.

A display may also be present, at which it can be read out with what accuracy the current estimated energy values are determined.

In one example, the second curve portion may comprise a portion of the remaining range from 0% to 40% of the total range. In another example, this range may comprise 0% to 20%, and in yet another example may comprise 0% to 60%. In order to express that this is a remaining range, a minus sign can be placed preceding the percentage value. However, the remaining range can also be displayed in absolute values.

In one example, the estimated energy value is subjected to filtering in order to arrive substantially at a stable course of the curve.

A filtering, e.g., by means of a Kalman filter, can generate a representative value from a plurality of measured values, whereby a continuous energy-range curve can be formed which can supply stable values. In particular, it may be ensured that the gradient of the curve remains constant as a function of falling estimated energy values.

In one example, the selected energy storage parameters of the energy storage management apparatus are determined by at least one measurement of the instantaneous electric current, the instantaneous voltage, the temperature of the energy storage device, and/or the internal resistance of the energy storage device.

According to a further aspect, the range estimation apparatus is configured to predict the temperature of the energy storage device and/or the internal resistance of the energy storage device.

These external parameters can be detected and provided with probes and/or sensors by means of the range estimation apparatus and/or by means of the energy storage management apparatus, and taken into account in the selection. By means of map and/or route information from a navigation system, a prediction can also be created via these parameters. In this way, a parameter relevant to the electric current flow can be determined very precisely.

The energy value of the energy present in an energy storage device may be specified in kWh. If the energy-range curve in kWh relative to the remaining range is indicated in km, i.e., in kWh/km, the remaining range can be ascertained by determining the available energy. If a stable estimated energy value can be specified by determining the estimated energy value based upon electric current parameters, a stable and reliable prediction of the remaining range can also be created.

According to yet another aspect, the energy management device has a display apparatus, wherein the display apparatus is set up to display the estimated range.

The display apparatus can be a navigation system and/or an onboard computer. However, it may also be an individual display which shows a digital range prediction value and/or an estimated range.

According to a further aspect, a method for providing an estimated energy value of an energy storage device is described, comprising the detection of a plurality of energy storage parameters present in the energy storage device. The method further comprises providing the plurality of detected energy storage parameters present in the energy storage device, and receiving the plurality of energy storage parameters—for example, in another module of an energy management device. The method may also comprise processing the plurality of energy storage parameters, and providing an estimated energy value from the plurality of energy storage parameters.

The object is achieved in that the method provides the selection of substantially only electric current parameters from the plurality of energy storage parameters, wherein an electric current parameter is a parameter which has an influence on the electric current flow into and/or out of the energy storage device.

According to yet another aspect, a program element is provided which, when it is run by a processor, executes the method for providing an estimated energy value of an energy storage device.

According to yet another aspect, a computer-readable storage medium is provided, in which a program is stored which, when run by a processor, executes the method for providing an estimated energy value of an energy storage device.

A floppy disk, a hard disk, a USB (universal serial bus) memory device, a RAM (random access memory), a ROM (read-only memory), or an EPROM (erasable programmable read-only memory) may be used as a computer-readable storage medium. An ASIC (application-specific integrated circuit) or an FPGA (field-programmable gate array) and an SSD (solid-state drive) technology or a flash-based storage medium can also be used as the storage medium. A web server or a cloud can also be used as the storage medium. A communications network, such as the Internet, which may allow a program code to be downloaded, may also be regarded as a computer-readable storage medium. A radio-based network technology and/or a wired network technology can be used.

A processor of the onboard system and/or a VCU (vehicle control unit) can also be used to carry out the method.

According to yet another aspect, a transport means is provided which has the energy management device.

A transport means can be a motor vehicle and/or a truck, an E-bike, an E-scooter, and/or a train.

Further advantages, features, and details are given in the following description, in which at least one example of an embodiment is described in detail—if necessary, with reference to the drawing. Described and/or pictorially represented features can form the subject matter by themselves or in any meaningful combination, and if necessary, also independently of the claims, and may in particular additionally also be the subject matter of one or more separate applications. Identical, similar, and/or functionally identical parts are provided with the same reference numerals.

DETAILED DESCRIPTION

Figure 1:
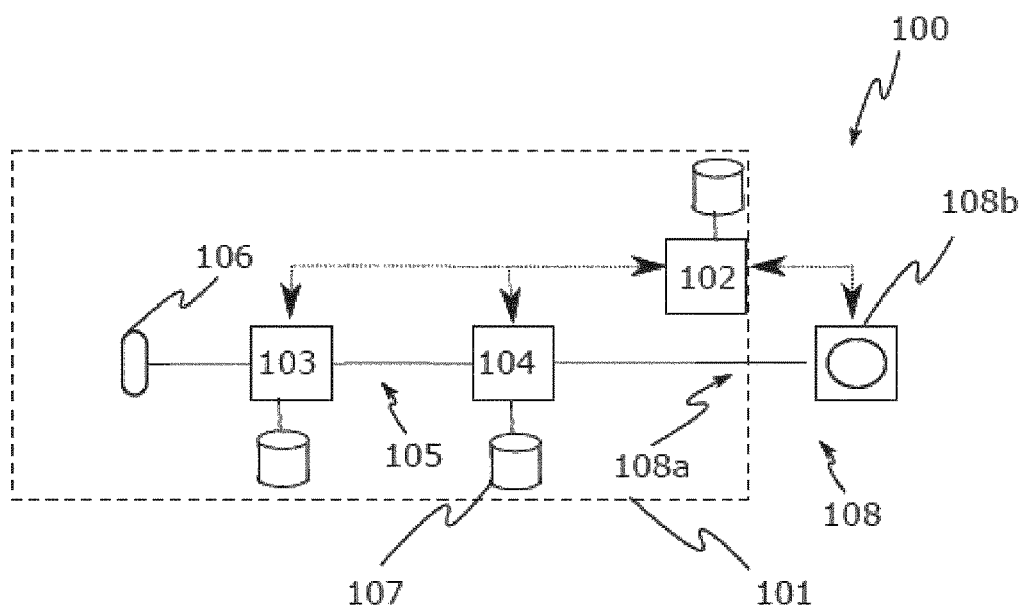
FIG. 1 shows an energy management device for an energy storage device according to an exemplary embodiment.

FIG. 1 shows an energy management device 100 for an energy storage device 106 according to an exemplary embodiment. Apart from the energy storage device 106, the energy management device 100 also has an energy storage management apparatus 103 or a battery management system 103 (BMS), an energy estimation apparatus 104, and an output apparatus 108b, which is connected to the energy estimation apparatus 104 via an interface 108a.

The energy storage management apparatus 103 detects a plurality of energy storage parameters present in the energy storage device 106 using corresponding sensors. The energy estimation apparatus 104 receives at least a portion of the plurality of energy storage parameters and determines an estimated energy value from these parameters. It makes this estimated energy value available via the interface 108a for further processing.

For determining the estimated energy value, the energy estimation apparatus 104 selects only a portion of the energy storage parameters provided to it. It substantially selects only electric current parameters from the provided plurality of energy storage parameters. The electric current parameters may be associated with the charging of the energy storage device. Via the charging, conclusions can also be drawn about the stored energy.

An electric current parameter is a parameter which has an influence on the electric current flow into and/or out of the energy storage device 106.

In an energy management device 100, energy estimations can be carried out at several points. The energy storage management apparatus 103 may be able to determine an estimated energy value. In this case, it uses a battery model. Alternatively and/or additionally, the energy estimation apparatus 104 may also be able to carry out such energy estimations. It uses a vehicle model for energy estimation.

The energy management device can be provided in a module housing 101 as a modular component and can be monitored and controlled by the processor 102.

An energy estimation apparatus 104 can be connected to the energy storage management apparatus 103 via the parameter interface 105. The energy estimation apparatus 104 can be connected via the external estimated energy value apparatus 105a to a display apparatus 108b, which is set up to determine and/or display the range prediction value.

The display apparatus 108b, together with the interface 108a for the estimated energy value, forms the range estimation apparatus 108. This serves to predict a remaining range to be assumed and converts the estimated energy value into an estimated range—for example, also by taking into account a future consumption.

In one example, the determination of the range prediction value or the remaining range can also be carried out at least partially in the energy estimation apparatus 104, i.e., the energy estimation apparatus 104 and the range estimation apparatus 108 can support one another.

Figure 2:
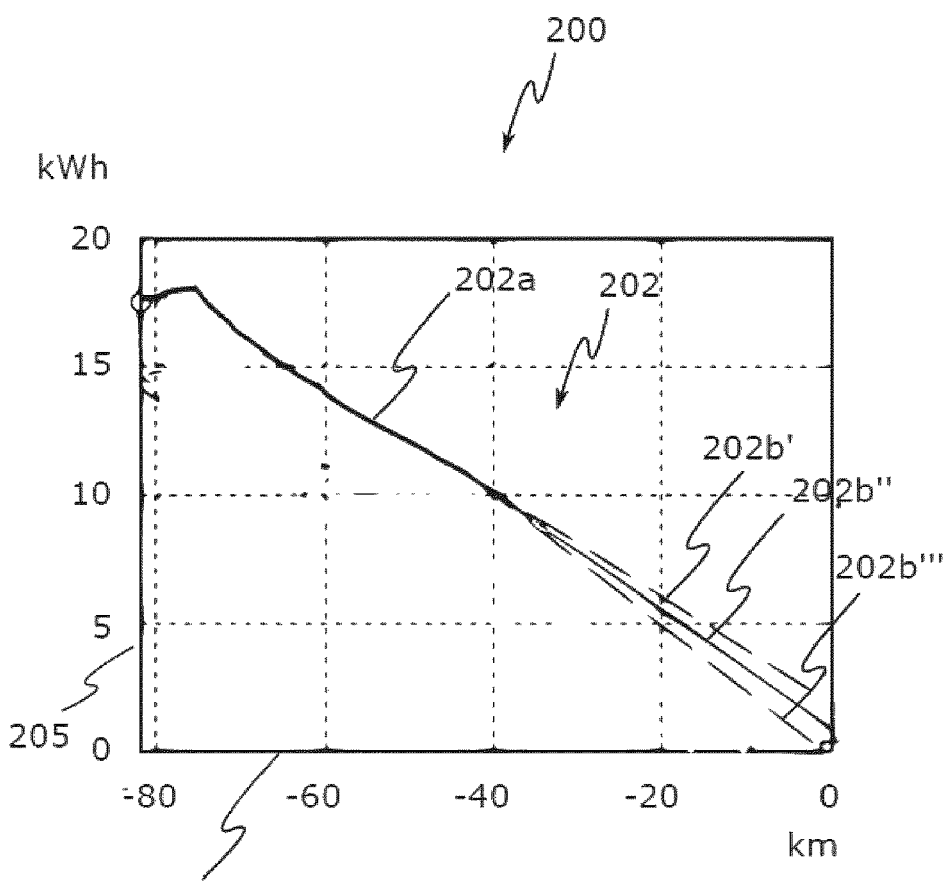
FIG. 2 shows an energy-range curve in an energy-range graph for better understanding.

FIG. 2 shows an energy-range curve 202 in an energy-range graph 200.

In the graph, the remaining range ranging from −80 km to 0 km is plotted on the abscissa 204. Energy values ranging from 0 kWh to 20 kWh are plotted on the ordinate 205.

The energy storage management apparatus 103 is equipped with several sensors in order to determine a plurality of parameters of the energy storage device. By corresponding switches and/or connections to the sensors, the energy estimation apparatus 104 may select which parameters of the plurality of provided parameters are used by it. In this case, it makes the selection to essentially use only electric current parameters for the estimated energy value and to essentially block non-electric-current parameters. In this way, an energy estimation can be carried out by a charge consideration.

By using the electric current parameters that are associated with the charging, the teaching may be used that the charge amount, and in particular the SoC (state of charge), which is an expression of the charge amount in percent of the total charge amount, essentially cannot be lost in a battery—for example, a lithium-ion battery.

This finding may thus be used in order to adjust a modeled energy-range curve 202 with the aid of the electric current parameter, such that a stable course results. A stable course may be characterized in one example in that the curve profile remains substantially unchanged in a predeterminable time range.

The energy-range curve 202 of FIG. 2 was not developed based upon electric current parameters. At the beginning of the driving cycle, it has an increase in energy at high energy values and thus has an infinite course, since, due to the charge decrease, only a continuous decrease can actually take place.

The use of the electric current parameters and the finding that the energy may continuously decrease can ensure that, in contrast to the energy modeled by means of non-electric-current parameters, the curve is substantially always continuous.

In order to get from the electric current parameters to an SoC without prior knowledge of the state of charge, a further lookup table can be determined from the cell voltage, in addition to a lookup table which is used for energy estimation and which, for example, takes into account a drop in the voltage at high load, wherein it has to be taken into account that the voltage can change depending upon other influencing factors, despite the same SoC. Such a lookup table may be stored in the database 107. A lookup table which indicates the voltage as a function of the load and/or a lookup table which indicates the dependence of the voltage as a function of another influencing factor may thus be stored in the database 107.

In another example, in which a known output value of the state of charge of the energy storage device is present, e.g., from the memory 207 from the previous driving cycle or after a defined charging, the value of the state of charge can be determined incrementally by charge balancing, by considering the electric current parameters.

If the charge is then determined via the electric current parameters, the charge can be converted, transformed, and/or reworked into energy. The energy values thus obtained may be stable and very reliable, and thus, for example, the energy-range curve 202 may be used to carry out the range estimation.

Since the range prediction is important in a low state-of-charge range and/or when there is a short remaining range, the exact range determination may be switched on only at a later point in time.

The energy-range curve 202 thus shows the two curve portions 202a, 202b. In the first range 202a, in which a sufficient energy supply is still present, a calculation of the exact range may not be as relevant as in the second range 202b. In the first range 202a, the modeling in the energy-range graph in any case has a discontinuity and a substantially unrealistic behavior. Here, an exact calculation of the remaining range may be expendable, whereas, in the further range, such a precise range calculation is desired, since it relates to the decision as to whether or not a destination can be reached.

The second range 202b is characterized by forming a plurality of curves 202b', 202b", 202b'". A range prediction calculation for different scenarios is carried out there in order, for example, to specify different behavior to the driver.

The curve 202b" shows the estimated range by extrapolation with the proviso that the journey be continued with previous conditions—for example, the same driving behavior.

The maximum range curve 202b' shows the estimated range for the case where travel is continued at a speed slowed by 10 km/h, and the minimum range curve 202b'" shows the estimated range for the case where travel is continued at a speed increased by 10 km/h.

In other words, it is shown in the graph 200 that, if the energy on the y-axis 205 decreases during the course of the journey, and the extrapolation of its averaged gradient indicated by the prediction curves 202b', 202b", 202b'" does not intersect the zero kWh at a value on the ordinate of y=0 kWh earlier than the zero kilometers at an abscissa value of x=0 km, then the range is sufficient. The image of the graph 200 can also be displayed as a result of the range prediction on the output apparatus 108b or display apparatus 108b, wherein the use of the electric current parameters ensures that the course is stable and that discontinuities as in FIG. 2 are avoided with high energy and long range.

However, such a stable course is not shown in FIG. 2.

In order to be able to avoid discontinuities, as can be avoided in FIG. 2 in the range of high energy values and extensive remaining ranges, the precise energy calculation can first be switched on later and can work with only small corrections at the beginning only using a lookup table.

The switching on of the more accurate calculation by means of electric current parameters may be triggered by a transition criterion, e.g., by an operating time, by a state of charge of the energy storage device 106, by a minimum distance to a destination, and/or by a trigger event.

For example, a longer period of time may be required until the parameters are available in a stable manner which permits the most accurate conversion possible of the charge amount into energy and are substantially independent of the electric current. The electric current itself is a measured value which is measured at regular intervals, and the parameters which are directly associated with the measured electric current are also continuously measured and provided.

Parameters which are not directly obtained from an electric current measurement can be determined, for example, from the driver profile and/or route profile. Such parameters can, for example, be determined in such a way that the electric current from the driver profile and/or route profile to be expected in the future is determined, which then also allows the future battery cell temperature and the ohmic resistance of the storage battery 106 under the load to be expected in the future to be predicted. In other words, a conversion of non-electric-current parameters to electric-current characteristic variables also takes place in order to be able to predict the expected load of the battery and the parameters decisive for the load withdrawal as precisely as possible.

The longer period of time until the parameters are available may, for example, arise in such a way that only a distance between 10 km and 20 km has to be covered until the more precisely operating range estimation in the energy management device 100 switches on by means of electric current parameters. A longer time may, for example, pass until a driver profile has been determined.

By means of the energy management device 100, various provided models of energy-range graphs 200 can be converted into an electric current parameter space and can provide, with the aid of the electric current parameters, stable and reliable range predictions and/or very accurate estimation ranges 202b', 202b", 202b'".

In order to be able to convert between the SoE graph 200 and an SoC graph (not shown in FIG. 2), a transformation curve which is increasingly steeper in its course can be used, which transformation curve takes into account the fact that, with a full battery and at high voltage, a charging unit corresponds to a greater energy than at low voltage.

However, a transformation curve has different forms at different temperatures and discharge currents, so that a transformation curve group dependent upon temperature and/or discharge current results. However, by means of the transformation curve, an energy-range curve 202 may also be used by means of electric current parameters and can be used for stable results, since the dependence of the energy determination upon the withdrawn power is eliminated.

For example, the parameters determined from the driver profile and/or route profile can be used in order to predict a future battery cell temperature and a future ohmic resistance of the storage battery 106 under the load to be expected in the future.

In a further example, instead of future values, the instantaneous electric current and/or instantaneous internal resistance measurement values of the plurality of energy storage parameters provided are used to calculate a correction value which enables the transformation between the SoE graph 200 and SoC graph and is not dependent upon a transformation curve.

During the range calculation, the electric current and temperature effects of the energy estimation may be shortened, since the range calculation uses the averaged consumption from the immediate past and thus, in the range calculation and energy estimation, substantially the same or at least similar corrections are carried out by the use of the electric current parameters.

Particularly in the range of low energy values and/or small remaining range values, i.e., when the energy storage device is almost empty, corrections at the SoE graph 200 by means of electric current parameters are necessary in order to arrive at stable values for the remaining range and in order to compensate for the low voltages of the batteries.

In other words, it may be provided that both the energy and a future consumption be determined on the basis of electric current parameters. The energy estimation and the range estimation can thus be carried out essentially using only electric current parameters.

In order to determine the ranges in which the electric-current-parameter-based range measurement can be switched on, reference is again made to FIG. 2. The first curve portion 202*a* of the energy-range curve 202 extends from the remaining range values of approximately −80 km to −42 km on the abscissa 204 and from energy values of 17.5 kWh to about 10 kWh on the ordinate 205.

The three second curve portions 202*b* may have the following properties.

The maximum range curve 202*b*' of the energy-range curve 202 extends from the range values of approximately −40 km to 0 km on the abscissa 204 and from energy values of 10 kWh to 2 kWh on the ordinate 205. There is therefore still sufficient energy at the destination.

The range prediction curve 202*b*" of the energy-range curve 202 extends from the range values of approximately −40 km to 0 km on the abscissa 204 and from energy values of 10 kWh to 1 kWh on the ordinate 205. There is thus still some energy at the destination.

The minimum range curve 202*b*''' of the energy-range curve 202 extends from the range values of about −40 km to 0 km on the abscissa 204 and from energy values of 10 kWh to 0 kWh on the ordinate 205. The destination can thus just be reached.

Without restricting the generality, an electrical energy storage device 106, and in particular a battery and/or accumulator, can be considered energy storage device 106. An electrical energy storage device 106 can be used, for example, as a drive, HV (high voltage), or traction battery in a BEV (battery electrical vehicle) and stores electrical energy as electrical charge. The stored electrical energy can be measured in ampere hours (Ah) or coulombs (C). In one example, a traction battery 106 can be designed as a lithium-ion battery.

If the discharge behavior of a traction battery 106 is considered, it can be determined that, as viewed over a short period of time, substantially the portion which is plugged in for use of the BEV contributes to the discharge of the traction battery, and in particular the portion plugged into the drive. The self-discharge can be substantially ignored in such a short-term consideration. It takes place in a period of months and therefore has essentially no influence on a driving cycle, i.e., on the range determination of a BEV.

The greatest proportion that thus has an influence on the range of a BEV is therefore the available energy of the energy storage device 106, which in turn depends upon the battery voltage. The battery voltage in turn is determined substantially by the instantaneous electric current currently drawn from the battery 106 and the internal resistance of the battery.

The energy draw is monitored by the battery management system (BMS) 103 or the energy storage management apparatus 103. This switches off the energy draw of a battery, for example, in order to protect the battery from deep discharge, for example. A BMS 103 may be part of an entire platform concept.

For users of a BEV 103, as far as possible, the technical details about charging and discharging a battery 106 should remain hidden. The driver of a BEV is interested fundamentally in how far the charge and/or the energy supply of its battery reaches and when the next stop has to be planned for charging. Essentially, a display apparatus 108*b* serves here to indicates to the driver the range of the remaining charge, e.g. by a chart representation 200. If only a state of charge display were to be presented to the driver, he would have to find out, during travel, which further influencing factors could still influence the range of his vehicle. In particular, he would have to know which electric current parameters are important for a precise display.

A range estimation apparatus 108 assumes the coordination of the full range of relevant information and the presentation of a range value 202*b*', 202*b*", 202*b*'''. The range estimation apparatus 108 receives its values and parameters, among other things, also from the energy storage management apparatus 103. It is desirable that the range estimation apparatus 108 deliver display values that are as stable as possible, since unstable and in particular abruptly changing values could result in the ranges being incorrectly estimated by the driver.

A stable display of the range may be achieved, for example, by using a selection, from the plurality of parameters and/or measured values provided by the storage device management device 103, of those parameters relating to the electric current. Care must be taken here to ensure that the parameters themselves are as stable as possible and are not subject to any fluctuations. Fluctuations can arise, for example, in that the electric current draw of a battery 106 varies greatly during the driving cycle due to strong accelerations and/or recuperation. As long as electric current parameters are used, these fluctuations can be detected by an electric current and/or charge balancing.

However, if voltages are used for energy determination, such electric current fluctuations could cause the battery to be loaded and the voltage to dip. In other words, the correct selection of a suitable parameter set from the plurality of provided parameters may enable a good, stable, steady, and reliable prediction model. Since the electric current currently drawn from the battery 106 plays a role in the determination of the SoE values, fluctuating electric current values would lead to fluctuating SoE values. During an electric current analysis and the determination of the SoC, such fluctuations can essentially be ruled out.

Stable display of a remaining range, which does not frequently change its value when a value is displayed, and which, in the event of a display of the remaining range as a graph, keeps its position and/or gradient substantially unchanged, may lead to a high driver confidence in the transport means.

Likewise, a continuous and substantially non-abruptly changing range display may lead to user confidence.

Therefore, the BMS 103 or the energy storage management apparatus 103 shown in FIG. 1 is designed such that it delivers a stable estimation of the energy present in the battery 106 because it essentially accesses electric current parameters which are well detectable by electric current and/or charge balancing, and are not disturbed or influenced—for example, by the load on the battery 106.

The energy-range curve 202 not based only upon electric current parameters provides complex modeling for the range estimation, in order to be able to carry out a compensation for, for example, a dipping voltage at high load. Despite these complex mechanisms, however, it is not possible to ensure a completely stable course. In particular in the region of the start of a driving cycle and/or with a high energy content, the energy-range curve 202 shows an unsteady and non-physical course, which, despite an energy draw, leads to an increase in the energy.

The battery cell temperature at the beginning of a driving cycle can also be dominated by the conditions during the shutdown phase or a soak. Therefore, the stabilized temperature during the power withdrawal may be more relevant and thus preferred for estimating the usable energy with respect to the battery cell temperature at the beginning of a driving cycle. Otherwise or alternatively, at the beginning of a driving cycle, it is therefore not the amount of charge stored during the preceding journey that is used, but also the temperature conditions in the battery prevailing at this time, i.e., also during a power withdrawal. The ambient temperature has a weak influence on these temperature conditions in the battery, prevailing during a power withdrawal, and the electric current intensity has a strong influence.

While the exact range of the BEV still plays a subordinate role in a full charge, it may be relevant if the SoE values approach the range around −20 km to 0 km, since, in this range of an almost empty battery, the range can be decisive in particular for the question of whether the destination and/or a remote charging station can still be reached with the remaining energy content of the battery 106. A precise calculation in particular in this range is therefore desirable. However, until the range of an almost empty battery is reached, the values from the new driving cycle and/or a prediction based upon these values may be available.

Figure 2A:
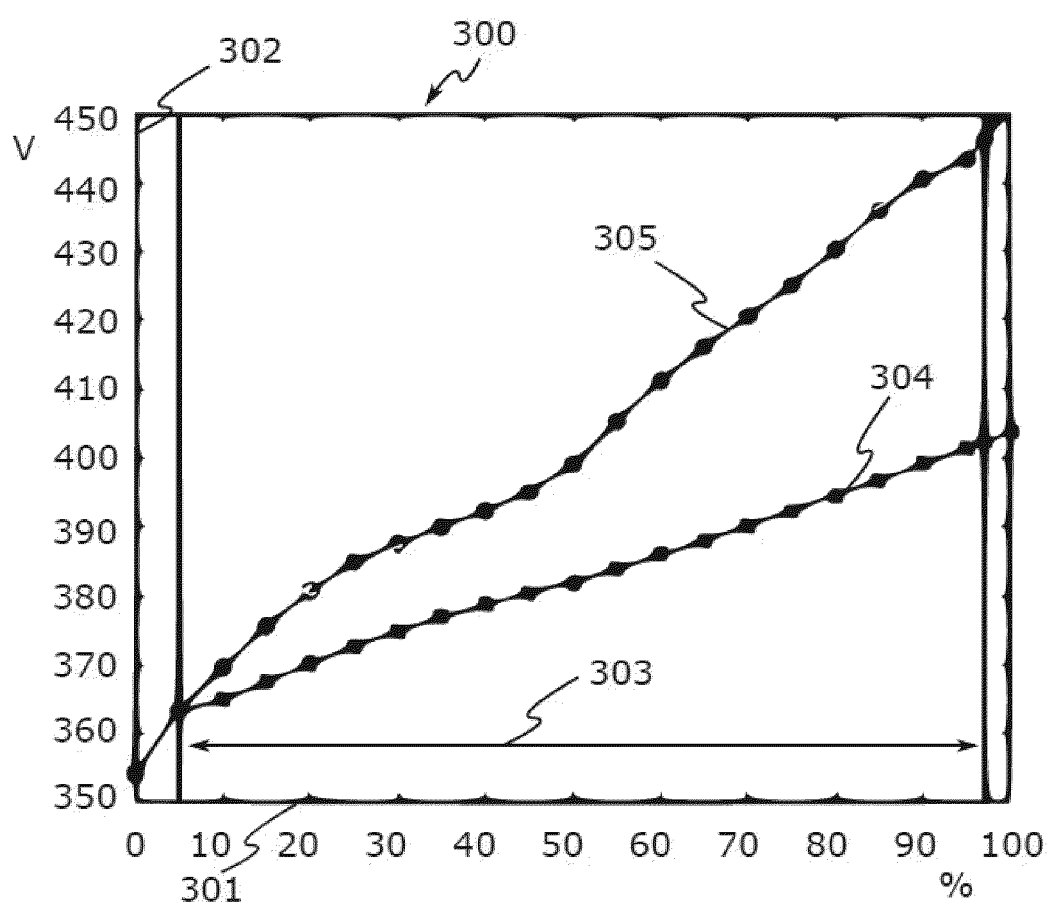
FIG. 2a shows a voltage-state of charge graph according to an exemplary embodiment.

FIG. 2a shows a voltage-state of charge graph 300 according to an exemplary embodiment.

The voltage-state of charge graph 300 shows, on the abscissa 301, SOC values from 0%, corresponding to a physically completely discharged battery, up to 100%, corresponding to a physically fully-charged battery. Voltage values from 350 V to 450 V are plotted on the ordinate 302.

Two battery voltage SOC curves 304, 305 are shown in the voltage state of charge graph 300, viz., the effective voltage curve 304 and the instantaneous voltage curve 305.

The instantaneous voltage curve 305 corresponds to the voltage actually to be measured at any point in time, wherein, instead of the usual open-circuit voltage, i.e., the voltage at zero electric current flow, the voltage which prevails during the draw of a typical electric current that is to be expected during travel or a predicted electric current is advantageously applied. If the currently present charge amount is multiplied by the instantaneous voltage at the current SoC, the energy that can be drawn from the battery would, however, be overestimated, since a lower voltage is also applied to the battery at a lower state of charge.

This overestimation may substantially be avoided by using the effective voltage curve 304. It is formed by forming the integral of the instantaneous voltage curve 305 from the current state of charge up to a minimum state of charge and subsequently dividing it again by the current state of charge. The result corresponds to the voltage applied on average during the remaining discharge of the battery, so that the usable energy can very easily be estimated by multiplying the current charge value.

In order to determine the remaining energy from the charge amount, the effective voltage curve 304 is preferably used, and the instantaneous voltage curve 305, which is shown in FIG. 2a for comparison purposes, is used merely as an alternative.

When a battery 106 is discharged—in particular, an HV battery 106—both curves 304, 305 are run through from the 100% SOC value on the right to the 0% SOC value on the left. During the discharge, the remaining charge in Ah (ampere hours) is preferably multiplied at any time by the previously mentioned average voltage 304 during the discharge, and not by the current instantaneous voltage 305. It can be seen at the course of the two curves 304 and 305 that the effective voltage curve 304 runs more linearly than the instantaneous voltage curve 305, whereby more stable predictions can be achieved.

The shown effective voltage curve 304 applies for a battery 106 that is warm from operation, since, at least in the case of a high state of charge, it can be assumed that the battery is correspondingly heated up until a critical state is reached. The discharged state of charge "empty" at 0% SOC or an almost discharged state of charge at 5% SOC may be regarded as a critical state.

In an alternative embodiment, it is possible to predict the temperature of the energy storage device 106 and/or the internal resistance of the energy storage device 106 using the energy estimation apparatus 104. By means of the predicted temperature and/or the internal resistance, the external voltage 302 of the battery 106, which is indicated by the instantaneous voltage curve 305, is then corrected by the temperature to be expected at any time, and then the remaining discharge 301 is determined. The battery 106 may be designed, for example, as a battery pack 106.

In order to determine the charge, the respective curve 304, 305 is integrated from the 0% value up to the current state of charge value 301, both when the effective voltage curve 304 is used, and, in the alternative embodiment, when the instantaneous voltage curve 305 with temperature correction is used.

It can also be seen from FIG. 2a that the SoC values 301 of the voltage-state of charge curves 304, 305 are in the operating range 303 or the maximum used SOC range 303, which ranges from about 5% to 98% SOC. In this way, disconnection mechanisms of the BMS 103 can be realized, which, for example, can prevent a complete discharge and/or deep discharge of the energy storage device 106. On a display apparatus 108b, this range of 5% to 98% can be scaled to 0% to 100%, e.g., by means of the range estimation apparatus 108, so that a user is given the impression that the full battery range has been exhausted, although they are using only a range of 5% to 98% of the physical charge. To prevent a deep discharge, the BMS 103 would already switch off the battery 106 at 5%, before the physical 0% discharge is reached.

Figure 2B:
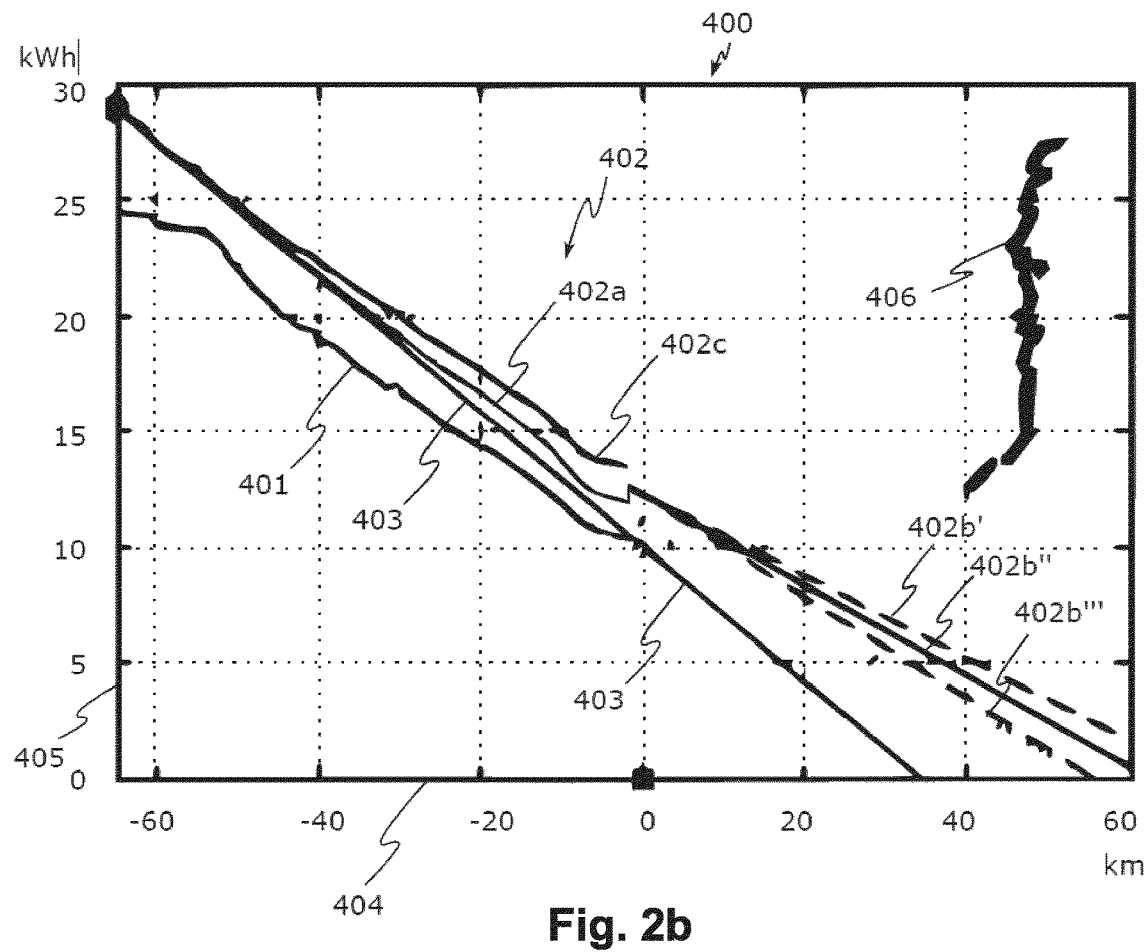
FIG. 2b shows two energy-range curves in an energy-range graph according to an exemplary embodiment.

FIG. 2b shows two energy-range curves 402 in an energy-range graph 400 according to an exemplary embodiment.

In the graph 400, the remaining range or distance is plotted on the abscissa 404 and ranges from −60 km to 0 km and from 0 km to 60 km. Energy values or the energy content of the battery in the range of 0 kWh to 30 kWh are plotted on the ordinate 205.

The energy-range curve 401 shows an energy-range curve without taking into account the electric current parameters. In this, the temperature measurement takes place at the beginning of the driving cycle, which is why the curve 401 almost stagnates at the beginning. This behavior is comparably implausible, similarly to the increase in the energy-range curve 202 at the beginning of the driving cycle. It can also be seen that, although energy is indeed consumed with a distance over 10 km, the calculation model is also "growing" simultaneously as a result of heating, and therefore the curve runs too flat. In the extreme case, the energy-range curve 401 may even increase, similarly to the energy-range curve 202.

The energy-range curve 402 again shows two curve portions 402a and 402b', 402b'', 402b''' and also 402b and 402b', 402b'', 402b'''. Two variants 402a, 402c of first curve portions are shown here.

The first curve portion 402a of the energy-range curve 402 shows a first variant of a first curve portion 402a of an energy-range curve 402 in which a charge model is used.

The first curve portion 402c of the energy-range curve 402 shows a second variant of an energy-range curve 402 in which an energy integral is used.

Both the first variant 402a and the second variant 402c were corrected taking into account the electric current parameters.

The curve 403 is a comparison curve which shows a linear course of an energy-range curve.

In both variants of the energy-range curves 402a, 402c, the destination at a charging station is reached at zero kilometers on the abscissa 404. The small offset between the curves 402a, 402b results here, since the battery has already been charged again. However, it is also ensured that a continuous and substantially offset-free course is formed, even if a slight offset can be seen in the representation.

The curves 402a, 402b are in each case steadily continued from the maximum range curve 402b', the range prediction curve 402b'', and the minimum range curve 402b''', which, according to the maximum range curve 202b', the range prediction curve 202b'', and the minimum range curve 202b''', satisfy a prediction about the range.

All assertions made for FIG. 2 may apply accordingly for FIG. 2b—in particular, the description of the components of the energy management device 100.

However, it should be noted that, for the journey shown in FIG. 2b, the charging stop was planned for approximately 60 km before the complete discharge was reached, and this results in a further remaining range. However—particularly in the example of FIG. 2—it is shown that the prediction can essentially be made so precisely that, by adapting the mode of operation shown by the dashed lines 202b', 202b'', 202b''' or 402b', 402b'', 402b''', the range can be extended as far as the destination if necessary.

FIG. 2b further shows a cumulative curve 406 formed of bold points, which shows the sum of distance and remaining range. The cumulative curve 406 is formed as a sum of the distance already traveled—in the example, as of km −65 or the distance traveled starting from −65 km, and the remaining range. This is plotted over the y-values 405 of the current energy content in kWh. The calculation result is transformed here and plotted in the x-direction 404 instead of in the y-direction 405. The calculation result is plotted in x instead of the usual plotting in y.

The nearly vertical profile of the cumulative curve 406, which approaches a vertical line of a substantially perfect prediction course, shows how well a range prediction can be made by taking into account the electric current parameters.

Since the prediction shown by means of the cumulative curve 406 decreases somewhat, and the consumption curves become steeper, it can be seen that, in the example shown in FIG. 2b, shortly before reaching the charging station, travel was quicker at the distance value 404 by about 0 km.

Further corrections can be included in the curves 402a, 402b by means of further electric current or temperature dependence curves, wherein the expected profile is taken into account. By this consideration of prediction values, the improvement relative to the curves 202 and 401 can be achieved in which the correction is carried out only from current measured values and not from prediction values.

The energy storage parameters determined by the BMS 103 or the energy storage management apparatus 103 are already pre-compensated and forwarded via the interface 105 to the energy estimation apparatus 104, which carries out a further prediction of the energy values of the battery 106 by, for example, essentially processing only electric current parameters.

The range estimation apparatus 108 is designed as a subsequent control system for the energy storage management apparatus 103 and has a range estimation algorithm and/or a method which can be designed as a sub-routine of the entire control method and records the available energy in the form of electric-current-based energy values.

The range estimation apparatus 108 also takes account of consumption values of additional consumers. These consumption values can be measured using external sensors, but predictions for the future can also be estimated only. Additional consumers often supply their energy requirement in the unit kW. However, this energy requirement can easily be converted into the unit kWh/100 km with data of the overall vehicle, such as the current speed or the prediction of the speed from the route planner, and can be added to the energy requirement for driving.

The range estimation apparatus 108 thus combines the electric-current-based values of the available energy and/or the charge of the battery 106 and the expected consumption values in order to determine a remaining range. In this case, the range estimation apparatus 108 may also calculate the electric-current-based consumption values and/or convert values based upon electric current parameters so as to have a common basis for billing with the electric-current-based energy values. As a result, independence from the voltage, which is determined with difficulty and only in an unstable manner, may be created.

The values of the range prediction and/or the remaining range determined by the range estimation apparatus 108 can be displayed via the display apparatus 108b to a user of the transport means—in particular, to the driver of the BEV. The display apparatus 108b can be designed as a human-machine interface (HMI), and in particular as a screen. Alternatively or additionally, the display apparatus 108b can also be connected to a coordination controller, in which further estimations can then be carried out and/or traffic data can be collected and retrieved.

Due to the fact that the energy storage management apparatus 103 or the BMS 103 has access to a database, the BMS 103 can also take into account a characteristic, known a priori, of the energy storage device 106 or a characteristic, known a priori, of the battery 106 in order to compensate for the lower voltage of an almost empty battery 106.

In a similar manner, the BMS 103 can also detect external parameters using probes and/or sensors and can use the instantaneous electric current in conjunction with an ambient condition in order to predict the temperature of the energy storage device 106 and/or the internal resistance of the energy storage device 106. Since the available energy of a battery 106 depends upon the battery voltage, which in turn may depend upon the instantaneous electric current through the battery 106 and the internal resistance of the battery 106, the electric current and temperature are influencing factors for the energy present in the battery 106. In this case, it may be advantageous for the temperature of the battery 106 to change very slowly.

Alternatively or additionally, the state-of-charge detection device 103 or the BMS 103 can be set up to carry out filtering of the SoE values and, for example, to generate a constant mean value over a longer period of time. This is because the instantaneous electric current through the battery 106 may change rapidly during driving, whereby it can result in an empty battery if instantaneous values are used.

However, as a whole, in the design of the energy management device 100, it may be provided that the energy storage management apparatus 103 be equipped with as little computing power as possible and be used essentially only as a supplier of the plurality of parameters.

Most corrections and/or compensations are carried out in the energy estimation apparatus 104, which is equipped with sufficient computing power and may be able to use the processor 102. The energy estimation apparatus 104 also has access to a vehicle model.

Since the battery temperature has an influence on the internal resistance of the battery 106, and the internal resistance has an influence on the energy available in the battery via the voltage, the prediction of the cell temperature of individual cells of the battery 106 may be helpful in the range estimation.

This is because the battery electric current can be used in combination with external parameters and/or ambient conditions, such as the outside temperature, and further known characteristic variables, such as the behavior of the battery cooling system, to predict the cell temperature of the battery 106 and the internal resistance of the battery 106.

In one exemplary embodiment, the range estimation apparatus 108 may thus be adapted to determine a specific consumption by means of the probes and/or sensors of the BMS 103 and other prediction values and/or historical data, and thus to calculate the battery electric current that is most likely present. This calculated consumption electric current to be expected can then be used to estimate the power and/or energy consumption to be expected for the remainder of the journey. A stable prediction of the range to be expected can be made from the determined stable remaining energy value of the battery 106 and the estimated future consumption value. This prediction is to remain as stable as possible until the destination is reached. Conditions that could lead to an increase in the energy consumption, such as strong gradients, can, for example, be taken into account by including data from traffic information and/or navigation systems in the range calculation. Likewise, a driving profile or driver profile may be taken into account—for example, sporty, aggressive, or defensive.

Figure 3:
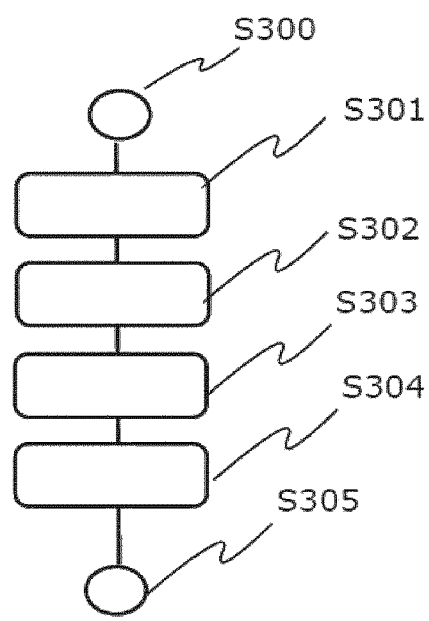
FIG. 3 shows a flowchart of a method for providing an estimated energy value of an energy storage device according to an exemplary embodiment.

FIG. 3 shows a flowchart of a method for providing an energy state value of an energy storage device 106 according to an exemplary embodiment.

Proceeding from a starting state S300, in the state S301, a plurality of energy storage parameters present in the energy storage device 106 are detected, e.g., as a result of the energy storage management apparatus 103 measuring, by means of sensors, specific standard parameters such as the discharging and/or charging electric current and/or a cell voltage, and, in addition, the plurality of detected energy storage parameters or energy storage parameters present in the energy storage device 106 are provided.

In state S302, the operation S302 provides a selection of essentially only electric current parameters, wherein an electric current parameter is a parameter which has an influence on the electric current flow into and/or out of the energy storage device 106. In other words, electric current parameters are preferred and/or filtered out during the selection.

In the state S303, the plurality of energy storage parameters, and in particular the selection of electric current parameters, are received. The selection and reception can take place, for example, in the energy estimation apparatus 104.

In the state S304, an estimated energy value from the plurality of energy storage parameters—in particular, from the electric current parameters—is determined and provided in order to forward the estimated energy value to a range estimation apparatus 108, for example.

The method ends in the state S305.

Although the methods and devices described herein have been further illustrated and explained in detail by preferred embodiments, they are not limited by the disclosed examples, and other variations may be derived therefrom by the person skilled in the art without departing from the scope. It is therefore obvious that a plurality of possible variations exist. It is also obvious that exemplary embodiments are actually only examples which are not to be understood in any way as limiting the scope, the possible applications, or the configuration, for example. Rather, the foregoing description and the figure description enable the person skilled in the art to implement the exemplary embodiments in a concrete manner, wherein the person skilled in the art, being aware of the disclosed inventive idea, can make a variety of changes, e.g., with regard to the function or the arrangement of individual elements mentioned in an exemplary embodiment, without departing from the scope defined by the claims and their legal equivalents, such as further explanations in the description.

The invention claimed is:

1. An energy management device for an energy storage device, comprising
    an energy storage device;
    an energy storage management apparatus;
    an energy estimation apparatus; and
    a range estimation apparatus;
    wherein the energy storage management apparatus is adapted to detect and provide a plurality of energy storage parameters present in the energy storage device;
    wherein the energy estimation apparatus is adapted to receive the plurality of energy storage parameters and to provide an estimated energy value from the plurality of energy storage parameters;
    wherein the energy estimation apparatus selects substantially only electric current parameters from the provided plurality of energy storage parameters;
    wherein an electric current parameter is a parameter which has an influence on the electric current flow into and/or out of the energy storage device;
    wherein the range estimation apparatus is adapted to convert the estimated energy value into an estimation range;
    wherein the range estimation apparatus uses an energy-range curve for converting the estimated energy value into the range, which energy-range curve is represented in electric current parameters;
    wherein the energy-range curve has a first and a second curve portion;
    wherein the second curve portion of the energy-range curve, which lies in the range of a low energy present in the energy storage device, has been determined with a higher accuracy than the first curve portion of the energy-range curve, which lies in the range of a high energy present in the energy storage device; and
    wherein the first curve portion is adapted to the second curve portion such that the energy-range curve forms a continuous curve.

2. The energy management device according to claim 1, wherein the electric current parameter is at least one energy storage parameter selected from the group of energy storage parameters consisting of:
- electric current balancing value;
- electrical resistance of the energy storage device;
- instantaneous voltage at the energy storage device;
- instantaneous electric current at the energy storage device;
- energy storage device temperature;
- age of the energy storage device; and
- inter-cell voltage difference of individual cells of the energy storage device.

3. The energy management device according to claim 1, wherein a transition from the first curve portion to the second curve portion of the energy-range curve depends upon at least one transition criterion selected from the group of transition criteria consisting of:
- an operating time;
- a state of charge of the energy storage device;
- a minimum distance to a destination; and
- a trigger event.

4. The energy management device according to claim 1, wherein the energy estimation apparatus is set up to predict the temperature of the energy storage device and/or the internal resistance of the energy storage device.

5. The energy management device according to claim 1, further comprising:
- a display apparatus;
- wherein the display apparatus is configured to display the estimated range.

6. Transport means having an energy management device according to claim 1.

7. A method for providing an estimated energy value of an energy storage device, comprising: detecting a plurality of energy storage parameters present in the energy storage device; providing the plurality of detected energy storage parameters present in the energy storage device;
receiving the plurality of energy storage parameters; providing an estimated energy value from the plurality of energy storage parameters; wherein, the step of providing the estimated energy value comprises selecting substantially only electric current parameters; and wherein an electric current parameter is a parameter which has an influence on the electric current flow into and/or out of the energy storage device; the method further including a step of converting the energy estimate into an estimated range; wherein an energy-range curve represented in current parameters is used to convert the energy estimate into the range; wherein the energy-range curve has a first and a second curve portion;
wherein the second curve portion of the energy-range curve, which lies in the range of a low energy present in the energy storage device, has been determined with a higher accuracy than the first curve portion of the energy-range curve, which lies in the range of a high energy present in the energy storage device; and
wherein the first curve portion is adapted to the second curve portion such that the energy range curve forms a continuous curve.

* * * * *